United States Patent Office 3,453,322
Patented July 1, 1969

3,453,322
2,4,6-TRIIODO-ISOPHTHALIC ACID AMIDES
Werner Obendorf and Irmgard Lindner, Linz (Danube), Austria, assignors to Osterreichische Stickstoffwerke Aktiengesellschaft, Linz (Danube), Austria
No Drawing. Filed Mar. 25, 1966, Ser. No. 537,322
Claims priority, application Austria, Mar. 31, 1965,
A 2,899/65, A 2,901/65
Int. Cl. C07c *103/84;* A61k *27/08*
U.S. Cl. 260—518               9 Claims

ABSTRACT OF THE DISCLOSURE 2,4,6-triiodoisophthalic acid having the formula:

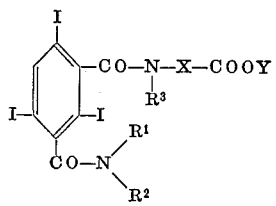

in which $R^1$ is hydrogen, lower alkyl, $\omega$-hydroxyalkyl having 2 or 3 carbon atoms or $\omega$-methoxyalkyl having 3 or 4 carbon atoms, $R^2$ is hydrogen or lower alkyl, $R^3$ is hydrogen, alkyl or isoalkyl having up to 4 carbon atoms, alkenyl having 3 or 4 carbon atoms, $\omega$-hydroxyalkyl having 2 or 3 carbon atoms, $\omega$-methoxyalkyl having 3 or 4 carbon atoms, phenyl or furanomethyl, X is ethylene, methylene, $\alpha$-methyl-ethylene or $\beta$-methyl-ethylene and Y is hydrogen, methyl, ethyl or the residue of a non-toxic inorganic or organic base.

---

The present invention relates to derivatives of 2,4,6-triiodoisophthalic acid and the preparation thereof. The compounds of this invention have valuable properties as X-ray contrast media and are very well suited to be used as the active substance in such media, especially for use in intravenous cholangiography and cholecystography.

In accordance with the present invention there is provided a derivative of 2,4,6-triiodoisophthalic acid having the formula

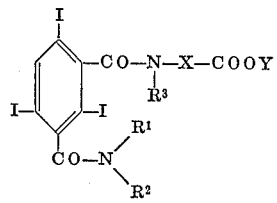

in which $R^1$ is a hydrogen atom, a lower alkyl group, an $\omega$-hydroxyalkyl group having 2 or 3 carbon atoms or an $\omega$-methoxyalkyl group having 3 or 4 carbon atoms, $R^2$ is a hydrogen atom or a lower alkyl group, $R^3$ is a hydrogen atom, or an alkyl or isoalkyl group having up to 4 carbon atoms, an alkenyl group having 3 or 4 carbon atoms, an $\omega$-hydroxyalkyl group having 2 or 3 carbon atoms, an $\omega$-methoxyalkyl group having 3 or 4 carbon atoms, or a phenyl or furanomethyl group, X is a methylene, ethylene, $\alpha$-methylethylene or $\beta$-methylethylene group and Y is a hydrogen atom, a methyl or ethyl group or the residue of a non-toxic inorganic or organic base. Especially preferred compounds are those which are derived from $\beta$-aminopropionic acid, aminoacetic acid or $\beta$-amino-$\alpha$-methylpropionic acid, in which $R^1$ is methyl or $\gamma$-methoxypropyl group, $R^2$ is a hydrogen atom and $R^3$ is a n-propyl, isopropyl or allyl group.

The present invention also provides a process for the preparation of a compound of Formula I above, which comprises reacting a N-substituted carbaminoyl-2,4,6-triiodobenzoyl chloride having the formula:

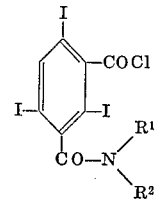

in which $R^1$ and $R^2$ are as defined above, with an amino acid ester having the formula:

$$HN-X-COOR$$
$$\underset{R^3}{|} \qquad \text{III}$$

in which R is a lower alkyl group and $R^3$ and X are as defined above, at an elevated temperature, and, if desired, subsequently saponifying the ester group and converting the resulting acid into a non-toxic salt. If desired the acid may be liberated from the salt.

The N-substituted carbaminoyl - 2,4,6 - triiodobenzoyl chlorides of Formula II above are new compounds.

The above reaction is preferably carried out in an inert organic liquid medium, for example chloroform, acetone, dioxane, tetrahydrofuran, methyl ethyl ketone, chlorobenzene or toluene. It is also possible to carry out the reaction in water or a mixture of water and an organic solvent which is miscible with water, instead of in an organic solvent. Furthermore, the reaction may also be carried out without a solvent.

The isolation of the compounds of Formula I is carried out by evaporating the solution which has beforehand been purified by various washing processes, after which the ester produced as the evaporation residue is in most cases immediately saponified. The isolation of the acid and salt from the saponification solution may be carried out in the usual manner. If the organic solvent used for the reaction of the acid chloride of Formula II is miscible with water, then it is necessary to remove the solvent by evaporation at the end of the reaction, and to take up the residue in a solvent which is not miscible with water. It is possible to carry out the reaction either with or without an acid-binding reagent, but in the latter case the amino-acid of Formula III must be present in excess in order to bind the acid which is eliminated.

The acid chloride of Formula II may be prepared by reacting the corresponding carboxylic acid with thionyl chloride. The carboxylic acid is obtained by deamination of a triiodoamino-isophthalic semiamide having the formula:

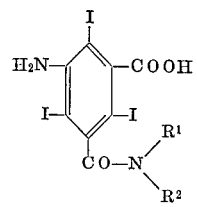

The compounds of general Formula I in part exist in two geometrically isomeric forms which may in principle be separated from one another.

As a result of their very low toxicity and good compatibility the compounds of Formula I are exceptionally well suited for use in X-ray diagnostics, for which they may be used in the form of their non-toxic salts but equally as the free acid or as an ester of the acid with an aliphatic alcohol.

Accordingly, the invention further provides an X-ray contrast medium which comprises, as the active ingredient, a derivative of 2,4,6-triiodoisophthalic acid having the Formula I herein and an inert solid or liquid extender or diluent.

Intravenous cholangiography and cholecystography may be named as the preferred fields of application. Thus it is found in pharmacological investigations of cats in which the animals have had 100 to 150 mg./kg. of the compound injected intravenously into the front leg vein that as a rule the shadow of the gall bladder became visible after only 30 minutes. At the same time extensive investigations of toxicity, compatibility, effect on blood pressure and haemolytic effects were carried out and these showed a low acute toxicity and exceptionally good compatibility of the compounds. Experiments with rats furthermore showed a good elimination ratio as between bile and urine, in favour of bile.

For intravenous cholangiography and cholecystography the compounds are preferably used in the form of the non-toxic salts from which injection or infusion solutions may be prepared by dissolving in water. Examples of such salts are: the sodium, methylglucamine and diethanolamine salts. The solutions may, for example, be administered at concentrations of about 40% by weight or 25% by weight, with 20 ml. of the solutions in each case being envisaged as a single dose.

In other fields of X-ray diagnostics, for example the photography of body cavities, it is, amongst others, also possible to use emulsions or suspensions of the acid and esters, for example in water or in oils.

The process for the preparation of the compounds of Formula I is illustrated in the following examples:

EXAMPLE 1

40.25 g. of 3-(N-methylcarbaminoyl)-2,4,6-triiodobenzoyl chloride (0.07 mole) are suspended in 70 ml. of chloroform and 22.35 g. of β-n-propylaminopropionic acid methyl ester (0.154 mole) were added thereto. The reaction mixture is heated for 1.5 hours on a water bath with stirring, under a reflux condenser. After cooling the mixture is diluted with chloroform and thoroughly extracted by shaking with dilute hydrochloric acid, water, sodium bicarbonate solution and water. The chloroform solution is dried over calcium chloride, filtered over potassium carbonate, and evaporated to dryness. On dissolving the 55 g. of oily evaporation residue in 35 ml. of methanol and adding ether, 16.25 g. of crystalline N-(3-N'-methyl-carbaminoyl - 2,4,6 - triiodobenzoyl) - N - n - propyl - β - aminopropionic acid methyl ester of melting point 142° to 149° C. separate out. 15.74 g. of this ester on saponification by boiling with 26 ml. of 1 N sodium hydroxide and subsequent acidification with hydrochloric acid yield 13.6 g. of colourless N-(3-N'-methylcarbaminoyl-2,4,6-triiodobenzoyl) - N - n - propyl - β - aminopropionic acid of melting point 262° to 265° C.

The evaporation residue of the ester mother liquor is 40.9 g. of an oily ester which on saponification with 70 ml. of 1 N NaOH and 40 ml. of methanol yields a crude acid which crystallises from methanol.

11.5 g. of an acid of melting point 262° to 264° C. is thus obtained. On adding 90 ml. of H$_2$O to the mother liquor, 9.6 g. of acid separate out, so that altogether 34.7 g. of N-(3-N'-methylcarbaminoyl-2,4,6-triiodobenzoyl)-N-n-propyl-β-aminopropionic acid are obtained.

EXAMPLE 2

25.9 g. of N-methylcarbaminoyl-2,4,6-triiodobenzoyl chloride are suspended in 80 ml. of chloroform, mixed with 8.3 g. of ethyl aminoacetate and boiled under reflux. A stiff crystalline paste is produced which, after filtering, washing with chloroform and boiling with water yields 25.6 g. of N-(3-N'-methylcarbaminoyl-2,4,6-triiodobenzoyl)-aminoacetic acid ethyl ester of melting point 278° to 281° C. On saponification of 22.5 g. of this ester by boiling with 40 ml. of 1 N caustic soda and 40 ml. of water and subsequent acidification with hydrochloric acid, 20.4 g. of N-(3-N'-methylcarbaminoyl-2,4,6-triiodobenzoyl)-aminoacetic acid of melting point 281° to 283° C. are obtained.

EXAMPLE 3

57.53 g. of N-methylcarbaminoyl-2,4,6-triiodobenzoyl chloride (0.1 mole) were suspended in 140 ml. of chloroform and treated with 24.6 g. (0.21 mole) of β-aminopropionic acid ethyl ester. The reaction to give N-(3-N'-methylcarbaminoyl - 2,4,6 - triiodobenzoyl) - β - aminopropionic ethyl ester takes place on warming. Thereafter the reaction mixture is boiled for a further 2 hours on a water bath under reflux, and the ester which crystallises out is filtered off after cooling. After evaporation of the chloroform from the mother liquor, further crystalline ester may be obtained from the evaporation residue. In total, 57.2 g. of ester of melting point 244° to 248° C. are obtained.

For saponification purposes, 32.8 g. of this ester were mixed with 60 ml. of methanol and heated for 30 minutes after addition of 60 ml. of 1 N NaOH, in the course of which the methanol largely evaporates. After diluting the mixture with water to a volume of 300 ml. and acidifying with hydrochloric acid, the N-(3-N'-methyl-carbaminoyl-2,4,6-triiodobenzoyl)-β-aminopropionic acid crystallises out. 30.55 g. of this acid of melting point 265° to 268° C. is thus obtained.

EXAMPLE 4

40.5 g. of N-methylcarbaminoyl-2,4,6-triiodobenzoyl chloride are suspended in 70 ml. of chloroform and treated with 18.3 g. of β-methyl aminopropionic acid methyl ester. The reaction is started by warming on a water bath. When the reaction has slackened the mixture is boiled under reflux for a further 2 hours and the solution then diluted with about 200 ml. of chloroform. The chloroform solution is successively shaken with dilute hydrochloric acid, water, potassium bicarbonate solution and finally with water, and is then dried. After evaporation of the chloroform, 48.6 g. of N-(3-N'-methylcarbaminoyl - 2,4,6 - triiodobenzoyl) - N-methyl-β-aminopropionic methyl ester remain as a clear oil. The oily ester is dissolved in 50 ml. of methanol and treated warm with 80 ml. of 1 N caustic soda. After evaporating off the methanol the solution is acidified with dilute hydrochloric acid, whereupon the crude acid precipitates. After isolation, the acid is recrystallised from 50% acetic acid. There is thus obtained 31.8 g. of colourless N-(3-N'-methylcarbaminoyl - 2,4,6 - triiodobenzoyl) - N-methyl-β-amino-propionic acid of melting point 260° to 268° C.

EXAMPLE 5

15 g. of aminoacetic acid are dissolved in 200 ml. of 1 N caustic soda. After adding 50 ml. of 4 N caustic soda and 300 ml. of acetone the mixture is treated dropwise with stirring with a solution of 118 g. of 3-N-dimethyl-carbaminoyl-2,4,6-triiodobenzoyl chloride. The reaction takes place at room temperature. The acetone is therefater distilled off, the solution diluted with water to a volume of 2500 ml. and, after addition of charcoal, clarified by filtering through filter pulp. The acid is precipitated from the resulting solution by acidification with hydrochloric acid. There is thus obtained 63 g. of N - (3 - N' - dimethyl-carbaminoyl-2,4,6-triiodobenzoyl)-aminoacetic acid of melting point 158° to 169° C.

EXAMPLE 6

57.53 g. of 3-N-methylcarbaminoyl-2,4,6-triiodobenzoyl chloride are mixed with 40 g. of β-anilinopropionic methyl ester and slowly heated to 140° C. The heat liberated by the reaction is removed by cooling, so that a temperature rise above 180° C. is avoided. When the reaction has slowed down the mixture is heated for a further hour to 140° C. The resulting reaction product is taken up with chloroform, the chloroform solution washed with dilute hydrochloric acid, water, potassium bicarbonate and water, and the dried chloroform solution evaporated. The residue is crystallised from 50 ml. of methanol and 150 ml. of ether.

37.9 g. of N-(3-N'-methylcarbaminoyl-2,4,6-triiodobenzoyl)-N-phenyl-β-aminopropionic acid-methyl ester of melting point 271° to 275° C. are obtained.

The ester is saponified by boiling with excess 1 N sodium hydroxide. The solution of the sodium salt so obtained is acidified with dilute hydrochloric acid whereupon the acid precipitates. After recrystallisation from methanol, 33.2 g. of N-(3-N'-methylcarbaminoyl-2,4,6-triiodobenzoyl)-N-phenyl-β-aminopropionic acid of melting point 222° to 227° C. are obtained.

The following compounds may be produced in a similar manner to that described in the preceding examples:

N - (3 - N' - methylcarbaminoyl-2,4,6-triiodobenzoyl)-N-ethyl-β-aminopropionic acid of melting point 262° to 266° C.

N - (3 - N' - methylcarbaminoyl-2,4,6-triiodobenzoyl)-N-isopropyl-β-aminopropionic acid of melting point 280° to 283° C.

N - (3 - N' - methylcarbaminoyl-2,4,6-triiodobenzoyl)-N-allyl-β-aminopropionic acid of melting point 219° to 223° C.

N - (3 - N' - methylcarbaminoyl-2,4,6-triiodobenzoyl)-N-2'-hydroxyethyl-β-aminopropionic acid of melting point 188° to 193° C.

N - (3 - N' - methylcarbaminoyl-2,4,6-triiodobenzoyl)-N-3'-methoxypropyl-β-aminopropionic acid of melting point 109° to 121° C.

N - (3 - N' - methylcarbaminoyl-2,4,6-triiodobenzoyl)-N-2-furanomethyl-β-aminopropionic acid of melting point 217° to 221° C.

N - (3 - N' - methylcarbaminoyl-2,4,6-triiodobenzoyl)-N-methylaminoacetic acid of melting point 170° to 175° C.

N - (3 - N' - methylcarbaminoyl-2,4,6-triiodobenzoyl)-N-n-butylaminoacetic acid of melting point 247° to 251° C.

N - (3 - N' - methylcarbaminoyl-2,4,6-triiodobenzoyl)-N-allyl-aminoacetic acid of melting point 162° to 167° C.

N - (3 - N' - methylcarbaminoyl-2,4,6-triiodobenzoyl)-N-n-propyl-β-amino-α-methylpropionic acid of melting point 185° to 191° C.

N - (3 - N' - methylcarbaminoyl-2,4,6-triiodobenzoyl)-N-allyl-β-amino-α-methylpropionic acid of melting point 130° to 136° C.

N - (3 - N' - methylcarbaminoyl-2,4,6-triiodobenzoyl)-N-3'-methoxypropyl-β-amino-α-methylpropionic acid amorphous, methyl ester of melting point 138° to 145° C.

N - (3 - N' - methylcarbaminoyl-2,4,6-triiodobenzoyl)-N-allyl-β-aminobutyric acid of melting point 130° to 141° C.

N - (3 - N' - methylcarbaminoyl-2,4,6-triiodobenzoyl)-N-3'-methoxypropyl-β-aminobutyric acid, amorphous.

The following are obtained in a similar manner but using 3-N-dimethylcarbaminoyl-2,4,6-triiodobenzoyl chloride as the acid chloride:

N-(3-N'-dimethylcarbaminoyl - 2,4,6 - triiodobenzoyl)-N-allyl-β-aminopropionic acid of melting point 104° to 114° C. amorphous.

N-(3-N'-dimethylcarbaminoyl - 2,4,6 - triiodobenzoyl)-N-3'-methoxypropyl-β-aminopropionic acid of melting point 87° to 99° C. amorphous.

Derivatives of 3-N-ethylcarbaminoyl-2,4,6-triiodobenzoic acid may also be obtained in a similar manner, but by reacting 3-N-ethylcarbaminoyl-2,4,6-triiodobenzoyl chloride:

N - (3 - N' - ethylcarbaminoyl-2,4,6-triiodobenzoyl)-N-allyl-aminoacetic acid of melting point 130° to 145° C., amorphous.

N-(3-N-ethylcarbaminoyl - 2,4,6 - triiodobenzoyl) - β-aminopropionic acid of melting point 286° to 289° C.

N - (3 - N' - ethylcarbaminoyl-2,4,6-triiodobenzoyl)-N-ethyl-β-aminopropionic acid of melting point 237° to 240° C.

N - (3 - N' - ethylcarbaminoyl-2,4,6-triiodobenzoyl)-N-3-methoxypropyl-β-amino-α-methylpropionic acid of melting point 107° to 114° C., amorphous.

Furthermore, the following may be obtained in a similar manner to the present examples:

N-(3-N'-3'-methoxypropyl-carbaminoyl - 2,4,6 - triiodobenzoyl)-N-methylaminoacetic acid, of melting point 199° to 202° C.

N-(3-N'-3'-methoxypropyl-carbaminoyl - 2,4,6 - triiodobenzoyl)-N-isopropyl-β-aminopropionic acid, of melting point 118° to 129° C., amorphous.

N-(3-N'-3'-methoxypropyl-carbaminoyl - 2,4,6 - triiodobenzoyl)-N-phenyl-β-aminopropionic acid, of melting point 218° to 221° C.

N - (3 - N' - β - hydroxyethylcarbaminoyl-2,4,6-triiodobenzoyl)-2-furano-methyl-aminoacetic acid of melting point 215° to 219° C.

N - (3 - N' - β - hydroxyethylcarbaminoyl-2,4,6-triiodobenzoyl)-N-n-propyl-β-aminobutyric acid, of melting point 134° to 143° C., amorphous.

N - (3 - N' - β - hydroxyethylcarbaminoyl-2,4,6-triiodobenzoyl)-N-allyl-β-aminobutyric acid, of melting point 119° to 130° C., amorphous.

Examples of the preparation of the X-ray contrast medium of the invention are given below:

EXAMPLE 7

684.07 g. of N-(3-N'-methylcarbaminoyl-2,4,6-triiodobenzoyl)-N-n-propyl-β-amino-α-methylpropionic acid are dissolved in 1000 ml. of 1 N sodium hydroxide, 17.1 g. of polyvinylpyrrolidone are dissolved therein, and the mixture made up to 1710 ml. A solution containing 40.0 g. of acid per 100 ml. of solution and suitable for injection purposes is obtained.

EXAMPLE 8

654.0 g. of N-(3-N'-methylcarbaminoyl-2,4,6-triiodobenzoyl)-N-allyl-aminoacetic acid are dissolved in 2000 ml. of 0.5 N NaOH and made up to a total volume of 2616 ml. The resulting solution contains 25.0 g. of acid per 100 ml. of solution.

EXAMPLE 9

714.10 g. of N-(3-N'-methylcarbaminoyl-2,4,6-triiodobenzoyl) - N - 3'-methoxypropyl-β-amino-α-methyl-propionic acid are first dissolved in a little water together with 193.20 g. of N-methyl-D-glucosamine, and then made up to a total volume of 1785 ml. The solution then contains 40.0 g. of acid per 100 ml. of solution and is suitable for injection purposes.

EXAMPLE 10

730.04 g. of sodium N-(3-N'-methylcarbaminoyl-2,4,6-triiodobenzoyl)-N-2-furanomethyl-β-aminopropionate are dissolved in water with gentle warming to give a clear solution and made up to a final volume of 2832 ml. The solution has a concentration of 25.0 g. of acid per 100 ml. of solution and is suitable for injection purposes.

The other compounds prepared in accordance with Examples 1 to 5 may also be made up into injectable solutions in a similar manner.

We claim:
1. A derivative of 2,4,6-triiodoisophthalic acid having the formula:

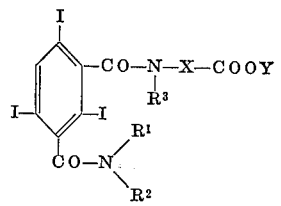

in which $R^1$ is selected from the group consisting of hydrogen, lower alkyl, ω-hydroxyalkyl group having 2 or 3 carbon atoms and ω-methoxyalkyl having 3 or 4 carbon atoms, $R^2$ is selected from the group consisting of hydrogen atom and lower alkyl, $R^3$ is selected from the group consisting of hydrogen, alkyl and isoalkyl having up to 4 carbon atoms, alkenyl having 3 or 4 carbon atoms, ω-hydroxyalkyl having 2 or 3 carbon atoms, ω-methoxyalkyl having 3 or 4 carbon atoms, phenyl and furanomethyl, X is selected from the group consisting of ethylene, methylene, α-methylethylene and β-methylethylene and Y is selected from the group consisting of hydrogen, methyl, ethyl and the residue of a non-toxic inorganic or organic base.

2. A derivative of 2,4,6-triiodoisophthalic acid according to claim 1 having the formula:

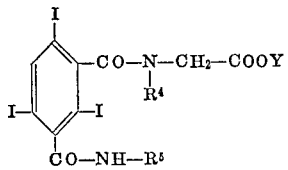

in which $R^4$ is selected from the group consisting of n-propyl, isopropyl and allyl, $R^5$ is selected from the group consisting of methyl and γ-methoxypropyl and Y is selected from the group consisting of hydrogen, methyl, ethyl and the residue of a non-toxic inorganic or organic base.

3. A derivative of 2,4,6-triiodoisophthalic acid according to claim 1 having the formula:

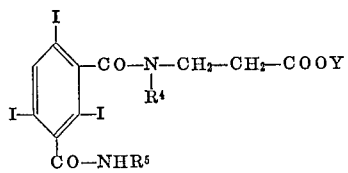

in which $R^4$ is selected from the group consisting of n-propyl, isopropyl and allyl, $R^5$ is selected from the group consisting of methyl and γ-methoxypropyl and Y is selected from the group consisting of hydrogen, methyl, ethyl and the residue of a non-toxic inorganic or organic base.

4. A derivative of 2,4,6-triiodoisophthalic acid according to claim 1 having the formula:

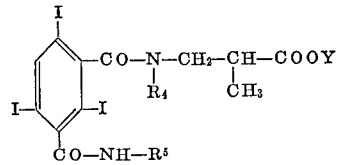

in which $R^4$ is selected from the group consisting of n-propyl, isopropyl and allyl, $R^5$ is selected from the group consisting of methyl and γ-methoxypropyl and Y is selected from the group consisting of hydrogen, methyl, ethyl and the residue of a non-toxic inorganic or organic base.

5. The compound according to claim 1 N-(3-N'-methylcarbaminoyl - 2,4,6-triiodobenzoyl)-N-n-propyl-β-aminopropionic acid.

6. The compound according to claim 1 N-(3-N'-methylcarbaminoyl - 2,4,6-triiodobenzoyl)-N-allyl-β-aminopropionic acid.

7. The compound according to claim 1 N-(3-N'-γ-methoxypropylcarbaminoyl-2,4,6-triiodobenzoyl)-N - isopropyl-β-aminopropionic acid.

8. The compound according to claim 1 N-(3-N'-methylcarbaminoyl - 2,4,6 - triiodobenzoyl)-N-allyl-aminoacetic acid.

9. The compound according to claim 1 N-(3-N'-methylcarbaminoyl - 2,4,6 - triiodobenzoyl)-N-n-propyl-β-amino-α-methylpropionic acid.

References Cited

UNITED STATES PATENTS 3,334,134  8/1967  Obendorf et al.

LORRAINE A. WEINBERGER, *Primary Examiner.*

L. ARNOLD THAXTON, *Assistant Examiner.*

U.S. Cl. X.R.

260—347.3, 347.4, 471, 501.11, 518, 519, 544; 424—5